May 3, 1927.
B. V. OGDEN
1,627,061
SWITCH FOR AUTOMOBILE STOP LIGHTS
Filed Oct. 19, 1923
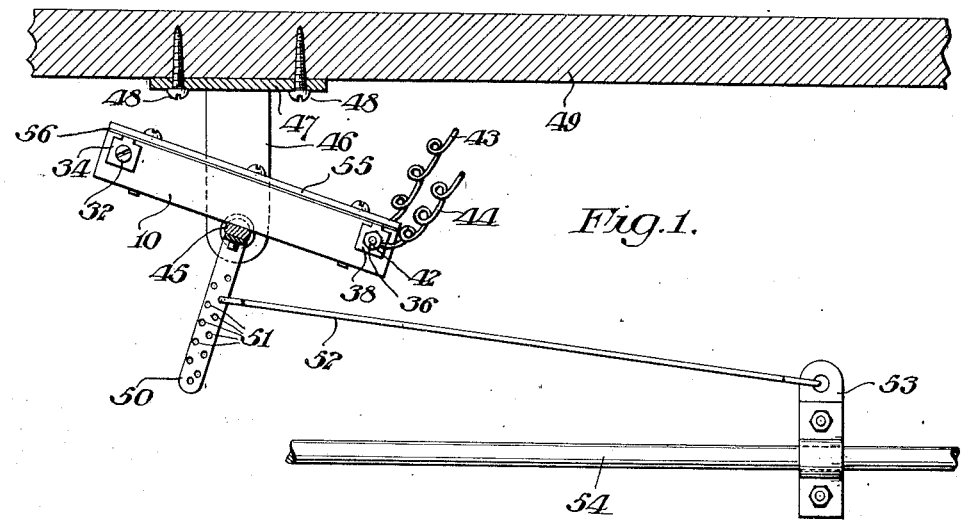
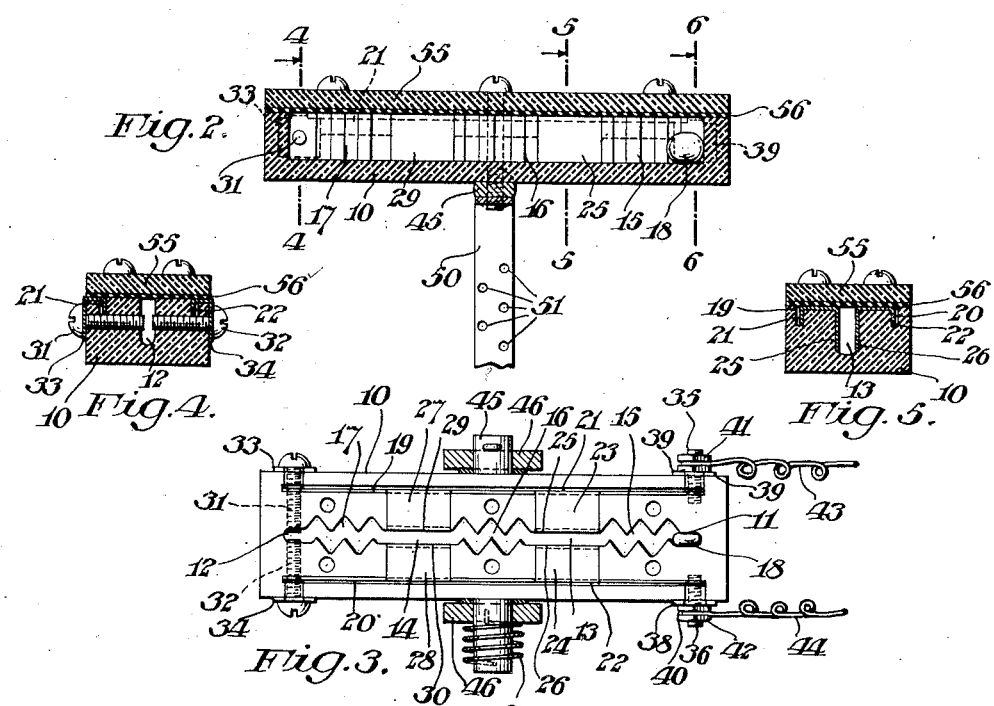
Inventor.
Benjamin V. Ogden
By Jas. C. Nobwsmith
Attorney.

Patented May 3, 1927.

1,627,061

UNITED STATES PATENT OFFICE.

BENJAMIN V. OGDEN, OF PHILADELPHIA, PENNSYLVANIA.

SWITCH FOR AUTOMOBILE STOP LIGHTS.

Application filed October 19, 1923. Serial No. 669,637.

My invention relates to a switch for an automobile "stop" light, that is to say, to a device for controlling the electric circuit of that type of signal light on motor vehicles which serves to indicate, to the drivers of vehicles in the rear, that the motor vehicle upon which the signal light is mounted is being checked in speed by the application of the brakes thereof.

The principal object of my invention is to provide an improved form of switch for electric signal systems of the type above mentioned which may be readily applied to a motor vehicle without requiring material change in the mechanism thereof, which will be inexpensive in its construction, and which is characterized by the absence of sliding contacts, etc., which are likely to get out of order and impaired in their efficiency, both mechanically and electrically, by reason of the constant operation of the same. A further object of my invention is to provide an improved form of switch which will serve preliminarily to make and break the circuit several times prior to the final closing of the circuit when the brakes are applied, whereby the attention of the drivers of other vehicles in the rear will be more positively attracted to the operation of the signal by the preliminary flashing of the light prior to the final closing of the circuit.

In my previous application for Letters Patent, filed August 23, 1923, Serial No. 658,854, there is shown and described a switch for "stop" lights involving the same broad underlying principles contemplated by this present application. However, in the specific embodiment of the invention which was shown in my said previous application, the switch was adapted to be directly associated with the brake pedal lever of the motor vehicle, while the present application contemplates the provision of a switch which is adapted to be mounted at any suitable position on the motor vehicle and is adapted to be actuated by means connecting the switch with any suitable moving part of the brake mechanism, such, for example, as the brake tension rod usually constituting a portion of the brake mechanism of the motor vehicle With the foregoing in view, my present invention contemplates the provision of a member made of insulating material having an internal passageway through which a globule of mercury is adapted to pass from one end to the other as the brake mechanism is actuated, there being provided in said passageway a plurality of pairs of contact members arranged at suitable places to establish an electrical connection through the globule of mercury as the same is caused to pass along said passageway when the brake mechanism is actuated, and said passageway being preferably so shaped as to prevent a too rapid passage of the mercury therethrough. My present invention also contemplates certain novel and improved details of construction, as will later appear.

The nature and characteristic features of my invention will be more readily understood from the following description, taken in connection with the accompanying drawings forming part hereof, in which:

Figure 1 is an elevational view, partly in section, illustrating certain fragmentary portions of a motor vehicle, with a device embodying the main features of my present invention shown in connection therewith;

Fig. 2 is a vertical, central, longitudinal section, enlarged, of the device, illustrating the internal construction of the same;

Fig. 3 is a horizontal plan thereof, but with the cover plate removed, the attachment bracket being shown in horizontal section;

Fig. 4 is a transverse section, taken approximately on the line 4—4 of Fig. 2;

Fig. 5 is a transverse section, taken approximately on the line 5—5 of Fig. 2; and Fig. 6 is a transverse section, taken approximately on the line 6—6 of Fig. 2.

Referring to the drawings, in the particular embodiment of my invention therein shown, 10 is a block of insulating material having an internal channel or passageway formed therein. The internal channel or passageway has relatively short, straight portions 11 and 12 at the respective ends thereof, and two intermediate straight portions 13 and 14, respectively. Between the straight portion 11 at the forward end and the intermediate straight portion 13, the channel or passageway has a sinuous portion 15. Likewise, between the straight portion 13 and the straight portion 14 is another sinuous portion 16, and also between the straight portion 14 and the straight portion 12 at the rear end there is another sinuous portion 17. A globule of mecury 18 is mounted in, and is adapted to travel from end to end of, the passageway in a manner and for a purpose to be hereinafter explained. On each side of the channel or passageway there are provided grooves or channels 19 and 20 for the reception of bus bars 21 and 22, respectively, preferably made of copper or other material of good electrical conductivity. The bus bars 21 and 22 are provided with integral extensions 23 and 24, respectively, which extend over and downward along the side walls of the straight portion 13 of the channel or passageway, as at 25 and 26 (see Fig. 5). The bus bars 21 and 22 are also provided with integral extensions 27 and 28, which also have portions 29 and 30, respectively, extending over and downward along the side walls of the straight portion 14 of the channel or passageway. It should be noted that the parts 25 and 26 are arranged contiguous to, but not touching each other, and likewise the portions 29 and 30 are similarly arranged.

At the rear end of the block of insulating material there are provided contact screws 31 and 32, the inner ends of which terminate within the straight portion 12 at the rear end of the passageway in the block 10, said inner ends of the screws 31 and 32 also being contiguous to but not touching each other. Extending portions 33 and 34, respectively, of the bus bars 21 and 22 are secured under the heads of the respective screws 31 and 32. At the forward end of the block there are provided stud screws 35 and 36, and extensions 37 and 38 from the bus bars 21 and 22 are secured under nuts 39 and 40, respectively, which are mounted on the stud screws 35 and 36. Binding or connection nuts 41 and 42 are also provided on the stud screws 35 and 36, for connecting the line wires 43 and 44 of the "stop" light circuit.

The block 10 is provided with a supporting shaft 45, the ends of which are journalled in the depending arms 46 of a bracket, the base portion 47 of which is preferably secured by means of wood screws 48, or in any other suitable manner, to the under side of the floor structure 49 of the automobile body. A lever arm 50 is secured to the supporting shaft 45 in any suitable manner, and is preferably provided with a plurality of apertures 51, variously spaced from the pivotal axis, and in any one of which one end of a tension or connecting rod 52 may be hooked, thus to provide a simple form of adjustment of the movement. The other end of the connecting rod 52 is pivotally attached to a member 53, which is adapted to be clamped at a suitable location upon the brake tension rod 54 of the automobile.

The member 53 is so located that, in the normal position of the brake tension rod 54, when the foot brakes are released, the block 10 will be tilted with the forward end down, as illustrated in Fig. 1 of the drawings. A coil spring 57 may be mounted upon the shaft 45, having one end engaging said shaft and the other engaging a portion of one of the depending arms 46 of the supporting bracket, this spring serving normally to maintain the block 10 in the tilted position shown in Fig. 1, but permitting the same to be tilted against the tension thereof during the operation of the device, in the manner as hereinafter explained.

A cover plate 55 is mounted upon the top of the block 10, and a layer of packing material 56 is interposed between the bottom surface of said cover plate 55 and the top of the block 10, thereby to prevent any portion of the globule of mercury 18 from escaping from the channel or passageway in the block 10.

The operation of the device may now be explained. As before stated, the block 10 is normally in the position shown in Fig. 1 of the drawings, the forward end being tilted downward as there shown, whereby the globule of mercury 18 will be positioned at the forward end of the internal passageway. When, however, the brake tension rod is moved forward, as the brakes are applied, the motion thereof will be transmitted through the member 53 and connecting rod 52 to the lever 50, which is carried by the shaft 45. In this manner, the block 10 will be tilted, so that the forward end thereof will be elevated, and the globule of mercury will thus be permitted to pass from the forward to the rear end of the internal passageway. In so doing, the globule of mercury will successively pass through the sinuous portion 15 of the passageway, thence between the contiguous portions 25 and 26 of the extensions 23 and 24 of the bus bars 21 and 22, thence through the sinuous portion 16 of the passageway, thence between the contiguous portions 29 and 30 of the respective extensions 27 and 28 of the bus bars 20 and 21, thence through the sinuous passageway 17, and finally stopping between the contiguous ends of the screws 31 and 32, which, as before stated, are respectively in electrical connection with the bus bars 21 and 22, by means of the extensions 33 and 34 of said bus bars. As the globule of mercury passes between the respective pairs of contact members which are arranged in the straight portions of the passageway, an electric circuit will be established thereby, through the line wires 43 and 44 which are in electrical communication with the bus bars 21 and 22 by means of the extensions 37 and 38 thereof, and the "stop" or signal light will be momentarily flashed as the globule of mercury passes each of said pairs of contact members. When the globule of mercury finally comes to rest at the rear end of the passageway, a circuit will be established through the screws 31 and 32, as long as the block 10 is maintained in the position with the front end elevated, that is to say, as long as the brakes are kept applied. It will be noted that, by the provision of the sinuous portions 15, 16 and 17 of the passageway, substantial time periods will occur between the successive flashings of the lamp prior to the final lighting of the same when the globule of mercury comes to rest at the rear end of the passageway, and this without unduly increasing the length of the structure, which would render the same impractical for its intended purpose.

It will be seen that there is thus provided a simple and efficient device of improved form for establishing an electrical connection for the purpose of lighting a "stop" or signal lamp whenever the brakes are actuated, which will be certain and positive in its action, which will not be likely to become disarranged or out of order through continued use, and in which provision is made for preliminary flashing of the light prior to the final lighting of the same, whereby the drivers of vehicles in the rear will have their attention more positively attracted to the operation of the signal.

Having thus described the nature and characteristic features of my invention, what I claim as new and desire to secure by Letters Patent is:

1. A switch for automobile "stop" lights and the like comprising a member made of insulating material having an internal passageway, a pair of bus bars internally mounted in said member and adapted to be electrically connected with a signal lamp circuit, a plurality of pairs of separated contact devices arranged at intervals in said passageway and electrically connected with said bus bars, a globule of mercury adapted to pass through said passageway to close said circuit as the same contacts with respective pairs of contact devices, said passageway being so shaped as to retard the passage of said globule of mercury, and means for mechanically associating the device with the brake mechanism of the automobile whereby the device will be tilted to thereby cause said globule of mercury to travel through said passageway when the brake mechanism is operated.

2. A switch for automobile "stop" lights and the like comprising a member made of insulating material having an internal passageway, a pair of bus bars internally mounted in said member and adapted to be electrically connected with a signal lamp circuit, a plurality of pairs of separated contact devices arranged at intervals in said passageway and electrically connected with said bus bars, a globule of mercury adapted to pass through said passageway to close said circuit as the same contacts with respective pairs of contact devices, said passageway having sinuous portions adapted to retard the passage of said globule of mercury, and means for mechanically associating the device with the brake mechanism of the automobile whereby the device will be tilted to thereby cause said globule of mercury to travel through said passageway when the brake mechanism is operated.

3. A switch for automobile "stop" lights and the like comprising a member made of insulating material having an internal passageway, a pair of bus bars internally mounted in said member and adapted to be electrically connected with a signal lamp circuit, a pair of contact members extending into the pasageway at one end thereof and electrically connected with said bus bars, a plurality of pairs of separated contact devices arranged at intervals in said passageway, said contact members comprising extensions of said bus bars, a globule of mercury adapted to pass through said passageway to close said circuit as the same contacts with respective pairs of contact devices, said passageway having sinuous portions adapted to retard the passage of said globule of mercury, and means for mechanically associating the device with the brake mechanism of the automobile whereby the device will be tilted to thereby cause said globule of mercury to travel through said passageway when the brake mechanism is operated.

4. A switch for automobile "stop" lights and the like comprising a member made of insulating material having an internal passageway, a pair of bus bars mounted in channels in said member and adapted to be electrically connected with a signal lamp circuit, a plurality of pairs of separated contacts devices arranged at intervals in said passageway, said contact members comprising integral extensions of said bus bars, a globule of mercury adapted to pass through said passageway to close said circuit as the same contacts with respective pairs of contact devices, and means for mechanically associating the device with the brake mechanism of the automobile whereby the device will be tilted to thereby cause said globule of mercury to travel through said passageway when the brake mechanism is operated.

5. A switch for automobile "stop" lights and the like comprising a member made of insulating material having an internal passageway, a pair of bus bars mounted in channels in said member and adapted to be electrically connected with a signal lamp circuit, a plurality of pairs of separated contact devices arranged at intervals in said passageway, said contact members comprising integral extensions of said bus bars, a globule of mercury adapted to pass through said passageway to close said circuit as the same contacts with respective pairs of contact devices, said passageway being so shaped as to retard the passage of said globule of mercury, and means for mechanically associating the device with the brake mechanism of the automobile whereby the device will be tilted to thereby cause said globule of mercury to travel through said passageway when the brake mechanism is operated.

6. A switch for automobile "stop" lights and the like comprising a member made of insulating material having an internal passageway, a pair of bus bars mounted in channels in said member and adapted to be electrically connected with a signal lamp circuit, a plurality of pairs of separated contact devices arranged at intervals in said passageway, said contact members comprising integral extensions of said bus bars, a globule of mercury adapted to pass through said passageway to close said circuit as the same contacts with respective pairs of contact devices, said passageway having sinuous portions adapted to retard the passage of said globule of mercury, and means for mechanically associating the device with the brake mechanism of the automobile whereby the device will be tilted to thereby cause said globule of mercury to travel through said passageway when the brake mechanism is operated.

7. A switch for automobile "stop" lights and the like comprising a member made of insulating material having an internal passageway, a pair of bus bars mounted in channels in said member and adapted to be electrically connected with a signal lamp circuit, a pair of contact members extending into the passageway at one end thereof and electrically connected with said bus bars, a plurality of pairs of separated contact devices arranged at intervals in said passageway, said contact members comprising integral extensions of said bus bars, a globule of mercury adapted to pass through said passageway to close said circuit as the same contacts with respective pairs of contact devices, said passageway having sinuous portions adapted to retard the passage of said globule of mercury, and means for mechanically associating the device with the brake mechanism of the automobile whereby the device will be tilted to thereby cause said globule of mercury to travel through said passageway when the brake mechanism is operated.

In testimony whereof, I have hereunto signed my name.

BENJAMIN V. OGDEN.